O. E. GEISEL.
POWER TRANSMISSION BELT.
APPLICATION FILED MAY 10, 1917.

1,255,594.

Patented Feb. 5, 1918.

INVENTOR
Otto E. Geisel
W. W. Williamson
Atty

UNITED STATES PATENT OFFICE.

OTTO E. GEISEL, OF PHILADELPHIA, PENNSYLVANIA.

POWER-TRANSMISSION BELT.

1,255,594.  Specification of Letters Patent.  Patented Feb. 5, 1918.

Application filed May 10, 1917. Serial No. 167,652.

*To all whom it may concern:*

Be it known that I, OTTO E. GEISEL, a citizen of the United States, residing at Philadelphia, in the county of Philadelphia and State of Pennsylvania, have invented new and useful Improvements in Power-Transmission Belts, of which the following is a specification.

My invention relates to new and useful improvements in power transmission belts, and the method of producing the same, and has for its object to provide an exceedingly simple and effective device of this character which will be relatively inexpensive in the cost of manufacture, although strong and durable, and not likely to separate at the joints.

A further object of the invention is to construct a power transmission belt of endless laminated construction, of substantially uniform strength and thickness, giving a smooth and practically continuous inner surface, because the meeting ends of the belt are on the outside thereof.

A still further object of the invention is to provide a method of constructing a belt of this character which consists of slitting the belt material transversely intermediate its edges, and also notching the same transversely inward from its edges a predetermined distance, passing one end of said belt through the slit or slot until the notches register with that portion of the belt at each end of the slot, then wrapping said belt about itself until the ends overlap, unraveling said ends or removing the weft threads, then laying one feathered end upon the other, then stitching the same transversely in the region of the joint and meeting ends, and then stitching the laminæ or layers longitudinally along their edges.

Another object of the invention is to construct a belt of the character stated, whereby the size thereof will be determined by the position of the slot and notches therein.

Another object of the invention is to produce a transmission belt of a number of plies or laminæ joined together by passing one layer through the other, then winding the same upon itself, until the ends are directly opposite each other, but separated by one or more plies of the belt and then connecting said ends and the intervening laminæ.

With these ends in view this invention consists in the details of construction and combination of elements hereinafter set forth and then specifically designated by the claims.

In order that those skilled in the art to which this invention appertains may understand how to make and use the same, I will describe its construction in detail, referring by numeral to the accompanying drawing forming a part of this specification, in which—

Figure 1:
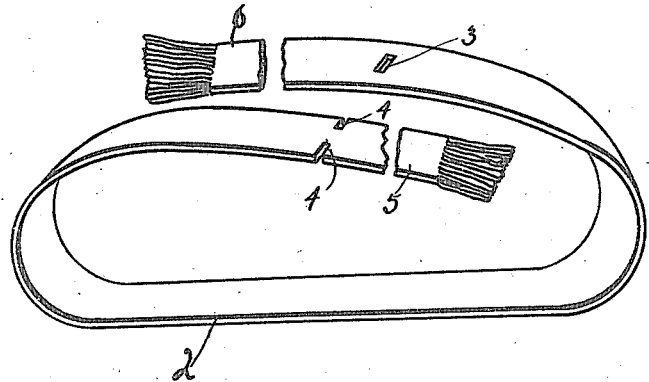
Figure 1, is a perspective view of a piece of webbing, illustrating its construction for use as a belt.

In carrying out my invention as herein embodied, I take a suitable strip of woven fabric 2, and form a transverse slot 3 therein, intermediate the edges of said strip, and at another point in said strip, determined by the size of the belt desired, I form transverse notches 4, extending from the edges inwardly, the desired distance so as to leave a solid portion equal in size to the slot 3. The end 5 of the strip is then passed through the slot 3, until the notches 4 register with the solid portions at each end of the slot 3, thus bringing both ends 5 and 6 on the outside of the belt strip lying between the slot and notches.

One or both of these ends 5 and 6 is then wound upon the webbing lying between the slot and notches to form a loop, comprising the laminations 7 and 8 of a desired ply, and a section of webbing required for the belt is so cut that one of the ends as 5 overlaps the other end any desired distance, so long as their termini do not reach the slot 3 or notches 4.

The weft threads of these overlapping ends are removed, or in other words, the ends are unraveled, so as to leave the warp threads free for the same distance that they overlap. These overlapping ends are then fastened together by transverse stitches 9, and if found desirable, may also be cemented together as is well known.

Figure 2:
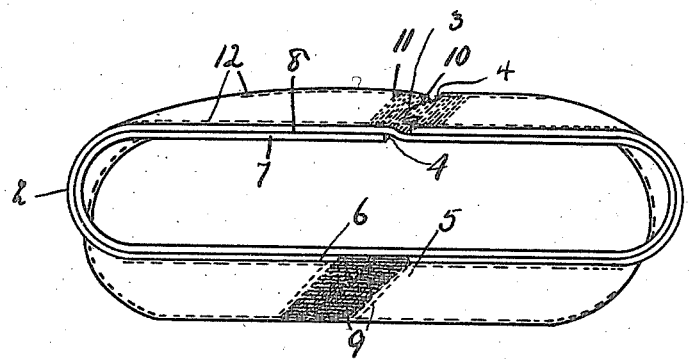
Fig. 2, is a similar view of the completed belt, the far edges of which have been thrown outward to clearly illustrate the construction.
Figure 3:
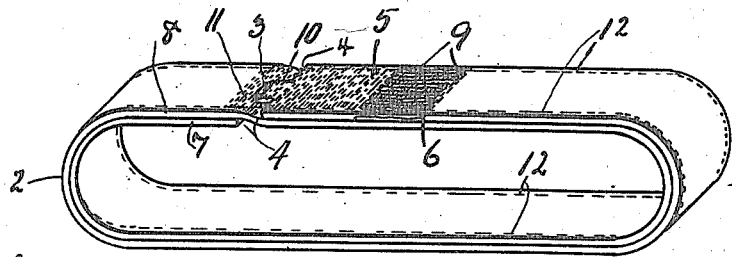
Fig. 3, is a perspective view of the completed belt showing the joined and meeting ends of the webbing in proximity to each other.

In Fig. 2, I have shown the meeting ends of the belt strip removed a considerable distance from the joint 10 formed by the passage of one ply of the belt strip through the other ply thereof, while in Fig. 3, I have shown the meeting ends overlapping adjacent the joint 10, and in the latter case, the transverse stitching may continue a sufficient distance to cover both the joined and the overlapping ends, but where the meeting ends are removed some distance from the joint as in Fig. 2, the parts of said joint could first be joined together by transverse stitches 11, then both edges of the laminations 7 and 8 could be joined together by stitches 12. If found desirable, said joint could first be stitched, then one of the edges could be stitched to a point adjacent the meeting ends, then some of the transverse stitching formed. After this has been done the other edge of the laminæ could be stitched together practically the entire distance around the belt and back to the region of the meeting and overlapping ends, where some additional transverse stitching 9 could be formed and the other edge of the laminæ joined together by stitching the same back to the joint.

By forming the belt in this manner, the two overlapping ends are left free after which the weft or filling threads may be raveled out to approximately the extent they overlap, leaving the necessary feathered ends which are approximately of the same thickness as a single ply of the belt strip.

These feathered ends will then be joined together by further transverse stitching as hereinbefore described, which stitching, as well as passing through the unraveled ends, also passes through the inner ply of the webbing.

Figure 4:
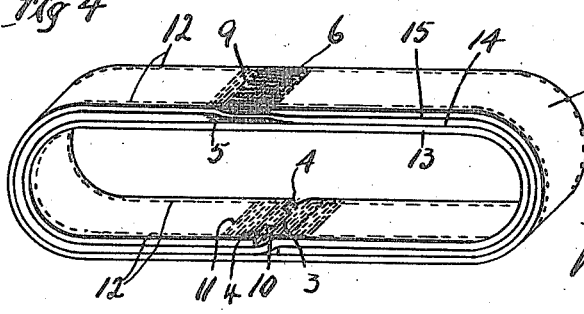
Fig. 4, is a similar view showing the belt made up of a greater number of plies or laminæ.

In Fig. 4, I have shown the belt made up more than two plies or laminæ as 13, 14, and 15, and while the joint in this form of the device is made in the same manner as described above, I continue the winding of the webbing upon itself, until one end as 5 lies between the plies 13 and 14, while the other end 6 overlaps the region of the belt occupied by the end 5, but said ends are separated by the ply 14 of the webbing. The ends 5 and 6 are unraveled and the parts are stitched together by transverse stitching 9 as herein before described, said stitching in this case passing through the unraveled ends, and the body of the webbing in plies 13 and 14.

The joint 10 may also be transversely stitched with the stitching passing through all of the plies of the webbing, and in the same manner described for the other form of belt, the edges may be joined together by longitudinal stitching 12.

Of course, I do not wish to be limited to the exact details of construction as herein shown, as these may be varied within the limits of the appended claims without departing from the spirit of my invention.

Having thus fully described my invention, what I claim as new and patentable is—

1. As an article of manufacture, an endless webbed belt, comprising a piece of single ply webbing, formed into superimposed layers with one layer passing through another layer, and having each end provided with warp threads, said warp threads overlapping, and means for stitching said overlapping warp threads to the inner layer of the webbing.

2. A belt comprising a section of webbing provided with a transverse slot intermediate its edges and transverse notches, projecting inwardly from its edges, the end adjacent the notches being passed through the slot, the ends being wound about that portion of the webbing lying between said slot and notches with the said ends overlapping each other, said overlapping ends being unraveled, and means for joining said unraveled ends to each other and to the inner portion of the webbing.

3. A belt comprising a section of webbing provided with a transverse slot intermediate its edges and transverse notches, projecting inwardly from its edges, the end adjacent the notches being passed through the slot, the ends being wound about that portion of the webbing lying between said slot and notches until one of the ends is inclosed by the plies of the webbing, and the other end overlies the region of the first named end, said ends being previously unraveled and means for joining said ends and the different plies of webbing together.

4. A belt comprising a section of webbing provided with a transverse slot intermediate its edges and transverse notches, projecting inwardly from its edges, the end adjacent the notches being passed through the slot forming a joint, the ends being wound about that portion of the webbing lying between said slot and notches with the said ends overlapping, said overlapping ends being unraveled, transverse stitches for joining the layers of webbing together in the region of the joint, other transverse stitches for joining the overlapping ends together and longitudinal stitches for joining the edges of the layers together.

5. The herein described method of producing a power transmission belt consisting in forming a slot and notches in the strip of material a predetermined distance apart, then passing the end adjacent the notches through the slot, winding the free ends upon that portion of the webbing between slot and notches until the ends overlap, then unraveling said ends and joining said ends to each other and the inner portion of the webbing.

In testimony whereof, I have hereunto affixed my signature.

OTTO E. GEISEL.